(12) United States Patent
Miyamoto et al.

(10) Patent No.: US 6,735,053 B2
(45) Date of Patent: May 11, 2004

(54) DISK DRIVE SYSTEM WITH INTERNAL ARM FOR PREVENTING SHOCK

(75) Inventors: Makoto Miyamoto, Sanda (JP); Hideki Kuwajima, Kyoto (JP)

(73) Assignee: Matsushita Electric Industrial Co., Ltd. (JP)

( * ) Notice: Subject to any disclaimer, the term of this patent is extended or adjusted under 35 U.S.C. 154(b) by 369 days.

(21) Appl. No.: 09/815,276

(22) Filed: Mar. 23, 2001

(65) Prior Publication Data

US 2001/0024344 A1 Sep. 27, 2001

(30) Foreign Application Priority Data

Mar. 27, 2000 (JP) ........................................ 2000-085479

(51) Int. Cl.$^7$ .............................. G11B 21/22; G11B 5/54
(52) U.S. Cl. ................................................... 360/256.4
(58) Field of Search ......................... 360/256.4, 256.2, 360/256, 256.1, 254, 250, 240

(56) References Cited

U.S. PATENT DOCUMENTS

| 5,341,259 | A | * | 8/1994 | Amirkiai et al. | 360/256.2 |
| 5,870,256 | A | * | 2/1999 | Khanna et al. | 360/256.4 |
| 6,163,440 | A | * | 12/2000 | Takahashi et al. | 360/256.4 |
| 6,342,991 | B1 | * | 1/2002 | Joshi et al. | 360/256.1 |
| 6,400,533 | B1 | * | 6/2002 | Liu et al. | 360/256.5 |
| 6,535,357 | B1 | * | 3/2003 | Misso et al. | 360/256.2 |
| 6,542,335 | B1 | * | 4/2003 | Misso et al. | 360/256.2 |
| 2002/0054455 | A1 | * | 5/2002 | Boutaghou | 360/256.4 |

* cited by examiner

Primary Examiner—Julie Anne Watko
(74) Attorney, Agent, or Firm—Parkhurst & Wendel, L.L.P.

(57) ABSTRACT

To provide a disk drive system provided with an inertial latching mechanism which has high reliability and can be arranged in a thin-model disk drive system. There is provided an inertial arm (7) engaging an actuator (22) when a head arm (25) is in or near a parking position and releasing engagement with the actuator (22) when the head arm (25) is in or near a position close to a disk (1) and energizing means for holding a position of the inertial arm (7) in a position where the engagement with the actuator (22) is released. Even if a rotational shock is externally applied when the actuator (22) remains in the parking position, moment of rotation is applied on each of the actuator (22) and inertial arm (7) in the same direction, the actuator (22) and inertial arm (7) mutually restrain their operations at an engaging part, and the oscillation of the actuator (22) to a data area can be avoided. When loading, a position of the inertial arm (7) is held by the energizing means in the position where the engagement with the actuator (22) is released so that the release of the engagement and mode of operation of the engagement between the actuator (22) and inertial arm (7) when loading/unloading can be surely achieved.

2 Claims, 16 Drawing Sheets

DISK DRIVE SYSTEM WITH INTERNAL ARM FOR PREVENTING SHOCK

FIELD OF THE INVENTION

The present invention relates to a disk drive system provided with a latching mechanism for holding an actuator in a parking position against an external shock.

BACKGROUND OF THE INVENTION

In a disk drive system, especially the disk drive system arranged in a portable personal computer such as of notebook size, higher reliability is now required with respect to a shock during non-operation.

When a slider mounted on an actuator is moved from a parking position to a data area on a surface of a disk by the shock during non-operation of the disk drive system, the slider is attached to or harms a surface of the data area, which causes a fatal fault.

An actuator locking mechanism is known as a mechanism for holding the actuator in the parking position during non-operation and preventing the actuator from being oscillated and moved to the surface of the data area by the shock.

Considered in a recent disk drive system is a loading/unloading mechanism of the slider for the purpose of preventing the slider from being attached to a surface of the shunting area and of obtaining higher reliability with respect to the above described shock. The loading/unloading mechanism is such that the actuator is held by a component called a ramp provided near an outer periphery of the disk during non-operation of the disk drive system to thereby shunt the slider so as not to make contact with the surface of the disk.

One of the actuator locking mechanisms uses an inertial latching mechanism. In the actuator locking mechanisms using the inertial latching mechanism, the above described ramp of the loading/unloading mechanism or a magnetic locking mechanism or the like is usually used together as an actuator holding mechanism.

The inertial latching mechanism operates when the shock is applied on the disk drive system and latches the actuator by utilizing a force of inertia produced by the shock. This inertial latching mechanism can latch the actuator against a strong shock which cannot be dealt with only by the above described magnetic locking mechanism. The above described actuator holding mechanism holds the actuator when a slight shock is applied against which the inertial latching mechanism does not operate and increases reliability of the actuator locking mechanism.

An example of such an actuator locking mechanism using the inertial latching mechanism is shown in FIGS. 17 and 18. This actuator locking mechanism uses the ramp of the loading/unloading mechanism as the actuator holding mechanism.

In the inertial latching mechanism shown in FIG. 17, when the shock is applied such that an actuator 22 is counterclockwise oscillated (toward a disk 1), a latch lever 101 is oscillated counterclockwise around an oscillatory axis by a force of inertia and an engaging projection 102 abuts against a tip 26c of a coil arm of the actuator 22 to latch the actuator 22.

The inertial latching mechanism shown in FIG. 18 uses two balls 202, which push a latch lever 201 with the force of inertia, and the latch lever 201 latches the actuator 22 around the oscillatory axis (National Publication International Patent Application No. 1997-503608 specification).

An another example of the actuator locking mechanism using the inertial latching mechanism is provided with the inertial latching mechanism shown in FIG. 17 and a magnetic or electromagnetic locking mechanism for magnetically or electromagnetically latching the actuator as the actuator holding mechanism (Japanese Patent Laid-Open No. 8-339645 specification).

A component such as the actuator oscillatably provided on the oscillatory axis is generally accelerated linearly and angularly by the external shock. A force by linear acceleration (a translational force) is applied on a mass center of gravity and a force by angular acceleration (a couple of force) is applied mainly on the oscillatory axis. In a circle around the oscillatory axis which passes the mass center of gravity, a tangential component on the mass center of gravity of the circle is regarded as an effective component and a normal component of the mass center of gravity as an ineffective component. Involved in the oscillation of the above described component is the effective components of the angular and linear acceleration.

DISCLOSURE OF THE INVENTION

When a large shock is applied such that the actuator 22 shown in FIGS. 17 and 18 is clockwise oscillated (apart from the disk 1), however, the actuator bumps against a crush stop (elastic body) 5 and is likely to be moved toward the disk 1 by rebound therefrom.

Namely, in the actuator locking mechanism and the inertial latching mechanism shown in FIG. 17, when the shock is applied such that the actuator 22 is clockwise oscillated (toward the crush stop 5), the inertial latching mechanism does not operate and cannot latch the actuator 22 reversely oscillated.

In the inertial latching mechanism shown in FIG. 18 which operates with the two balls even when the shock is applied in either direction, it is necessary to enlarge mass of the balls or to reduce moment of inertia of the latch lever in order to assure the operation. There is a limit in reducing the moment of inertia of the latch lever, and the enlargement of the mass of the balls makes it difficult to arrange the inertial latching mechanism in a thin-model disk drive system.

The present invention solves such conventional problems and has its object to provide a disk drive system provided with an inertial latching mechanism which has high reliability and can be arranged in a thin-model disk drive system.

In order to achieve the above object, a disk drive system according to aspect 1 of the present invention comprises: an actuator having a head arm mounted with a slider having a head element for recording data in a disk recording medium and reading the recorded data, unloading the head arm to a parking position and loading the head arm from the parking position such that the slider comes close to a surface of the disk recording medium; an inertial arm rotatably supported, engaging the actuator when the head arm is in or near the parking position and releasing the engagement with the actuator when the head arm is in or near a position close to the disk recording medium; and energizing means for holding a position of the inertial arm in a position where the engagement with the actuator is released. Even if a rotational shock is externally applied when the actuator remains in the parking position, moment of rotation is applied on each of the actuator and inertial arm in the same direction and the actuator and inertial arm mutually restrain their operations at an engaging part. Accordingly, oscillation of the actuator to a data area can be avoided. Further, when loading, the position of the inertial arm is held by the energizing means in the position where the engagement with the actuator is released, and the release of the engagement and mode of operation of the engagement between the actuator and inertial arm when loading/unloading can be surely achieved.

In the disk drive system according to aspect 2 of the present invention, the actuator and the inertial arm in aspect 1 have balanced mass with respect to respective centers of rotation.

In the disk drive system according to aspect 3 of the present invention, a ratio of inertia of the actuator and the inertial arm in aspect 1 is equal to a ratio of a distance from the center of rotation of the actuator to an engaging part and a distance from the center of rotation of the inertial arm to the engaging part.

A disk drive system according to aspect 4 of the present invention comprises: an actuator having a head arm mounted with a slider having a head element for recording data in a disk recording medium and reading the recorded data, unloading the head arm to a parking position and loading the head arm from the parking position such that the slider comes close to a surface of the disk recording medium; an inertial arm rotatably supported, engaging the actuator when the head arm is in or near the parking position, releasing the engagement with the actuator when the head arm is in or near the position close to the disk recording medium and having a wind receiver for receiving a force of air flow produced by rotation of the disk recording medium. Even if a rotational shock is externally applied when the actuator remains in the parking position, moment of rotation is applied on each of the actuator and inertial arm in the same direction and the actuator and inertial arm mutually restrain their operations at an engaging part. Accordingly, oscillation of the actuator to a data area can be avoided. Further, when loading, the wind receiver receives the force of air flow produced by the rotation of the disk recording medium so that the force is always applied on the inertial arm in a direction of releasing the engagement with the actuator. Therefore, the position of the inertia arm is held without the energizing means according to aspect 1, and the release of the engagement and mode of operation of the engagement between the actuator and inertial arm when loading/ unloading can be surely achieved.

In the disk drive system according to aspect 5 of the present invention, the actuator and the inertial arm in aspect 4 have balanced mass with respect to respective centers of rotation.

In the disk drive system according to aspect 6 of the present invention, a ratio of inertia of the actuator and the inertial arm in aspect 4 is equal to a ratio of a distance from the center of rotation of the actuator to an engaging part and a distance from the center of rotation of the inertial arm to the engaging part.

A disk drive system according to aspect 7 of the present invention comprises: an actuator having a head arm mounted with a slider having a head element for recording data in a disk recording medium and reading the recorded data, unloading the head arm to a parking position and loading the head arm from the parking position such that the slider comes close to a surface of the disk recording medium; an inertial arm rotatably supported, engaging the actuator when the head arm is in or near the parking position and releasing engagement with the actuator when the head arm is in or near the position close to the disk recording medium; first holding means for holding a position of the inertial arm in a position where engagement with the actuator is released; and second holding means for holding the actuator or inertial arm in the parking position. Providing the second holding means for holding the actuator or inertial arm permits always holding the position of the actuator against a slight shock which occurs in the parking position. Namely, oscillation of the actuator to a data area can be avoided even when the slight shock is applied against which the inertial arm does not operate.

More specifically, even if a rotational shock is externally applied when the actuator remains in the parking position, moment of rotation is applied on each of the actuator and inertial arm in the same direction and the actuator and inertial arm mutually restrain their operations at an engaging part. Further, when loading, the position of the inertia arm is held by the first holding means with the engagement between the actuator and inertial arm remaining released. Moreover, when the actuator remains in the parking position, the position of the actuator is held by the second holding means.

In the disk drive system according to aspect 8 of the present invention, the actuator and the inertial arm in aspect 7 have balanced mass with respect to respective centers of rotation.

In the disk drive system according to aspect 9 of the present invention, a ratio of the inertia of the actuator and the inertial arm in aspect 7 is equal to a ratio of a distance from the center of rotation of the actuator to an engaging part and a distance from the center of rotation of the inertial arm to the engaging part.

A disk drive system according to aspect 10 of the present invention comprises: an actuator having a head arm mounted with a slider having a head element for recording data in a disk recording medium and reading the recorded data, unloading the head arm to a parking position and loading the head arm from the parking position such that the slider comes close to a surface of the disk recording medium; an inertial arm rotatably supported, engaging the actuator when the head arm is in or near the parking position and releasing engagement with the actuator when the head arm is in or near the position close to the disk recording medium; and first holding means for holding a position of the inertial arm in a position where the engagement with the actuator is released, and in the parking position, a line connecting the center of rotation and a mass center of gravity of the actuator makes an acute angle with a line connecting the center of rotation and a mass center of gravity of the inertial arm, which can substantially equalize a direction of moment of rotation by linear acceleration applied on each of the actuator and inertial arm. Accordingly, not only a rotational shock but also the operation of the actuator relative to the linear acceleration applied on the mass center of gravity can be restrained, and even if the rotational shock is applied when the actuator remains in the parking position, the moment of rotation is applied on each of the actuator and inertial arm in the same direction. Further, even if a linear shock is applied on the mass center of gravity, the moment of rotation applied on each of the actuator and inertial arm has substantially the same direction. Therefore, the actuator and inertial arm mutually restrain their operations at an engaging part against any shock and oscillation of the actuator to the data area can be avoided.

In the disk drive system according to aspect 11 of the present invention, a ratio of the inertia of the actuator and the inertial arm in aspect 10 is equal to a ratio of a distance from the center of rotation of the actuator to an engaging part and a distance from the center of rotation of the inertial arm to the engaging part.

A disk drive system according to aspect 12 of the present invention comprises: an actuator having a head arm mounted with a slider having a head element for recording data in a disk recording medium and reading the recorded data, unloading the head arm to a parking position and loading the head arm from the parking position such that the slider comes close to a surface of the disk recording medium; an inertial arm rotatably supported, engaging the actuator when the head arm is in or near the parking position and releasing engagement with the actuator when the head arm is in or near a position close to the disk recording medium; first holding means for holding a position of the inertial arm in the position where the engagement with the actuator is released; and second holding means for holding the actuator or inertial arm in the parking position, and in the parking position, a line connecting a center of rotation and a mass center of gravity of the actuator makes an acute angle with a line connecting a center of rotation and a mass center of gravity of the inertial arm, and oscillation of the actuator to the data area can be avoided with respect to both of a slight rotational shock against which the inertial arm does not operate and a linear shock.

More specifically, even if the rotational shock is applied when the actuator remains in the parking position, moment of rotation is applied on each of the actuator and inertial arm in the same direction. Even if the linear shock is applied on the mass center of gravity, the moment of rotation applied on each of the actuator and inertial arm has substantially the same direction. Therefore, the actuator and inertial arm mutually restrain their operations at an engaging part against any shock. Further, when loading, the position of the inertia arm is held by the first holding means with the engagement between the actuator and inertial arm remaining released. Moreover, even if the slight rotational shock is externally applied when the actuator remains in the parking position, the position of the actuator is held by the second holding means.

In the disk drive system according to aspect 13 of the present invention, a ratio of the inertia of the actuator and the inertial arm in aspect 12 is equal to a ratio of a distance from the center of rotation of the actuator to an engaging part and a distance from the center of rotation of the inertial arm to the engaging part.

DESCRIPTION OF THE EMBODIMENTS

Embodiments of the present invention will be described below with reference to FIGS. 1 to 16.

(Embodiment 1)

FIGS. 1 to 7 show (Embodiment 1) of the present invention.

Figure 1:
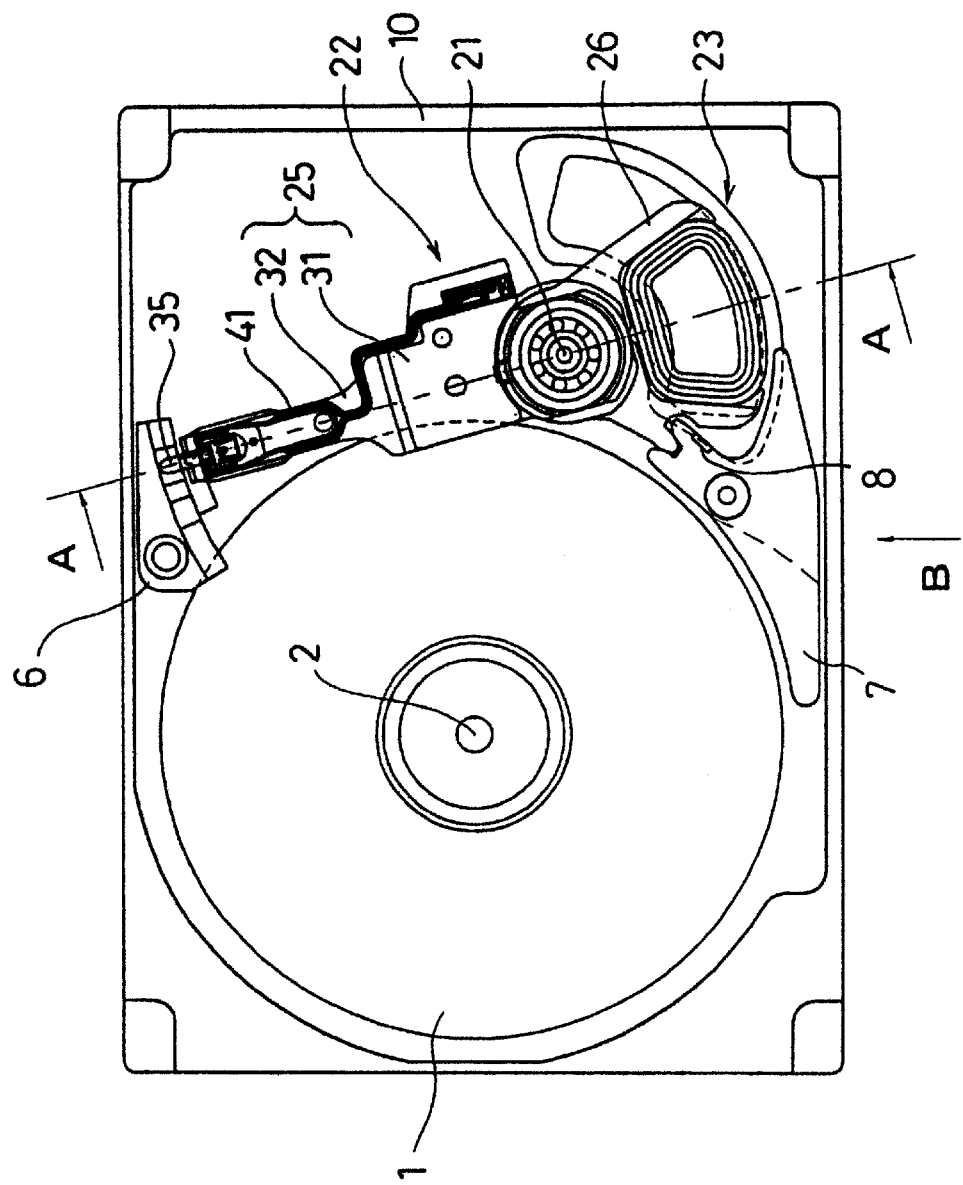
FIG. 1 is a schematic plan view of a configuration of a disk drive system according to (Embodiment 1) of the present invention.
Figure 2:
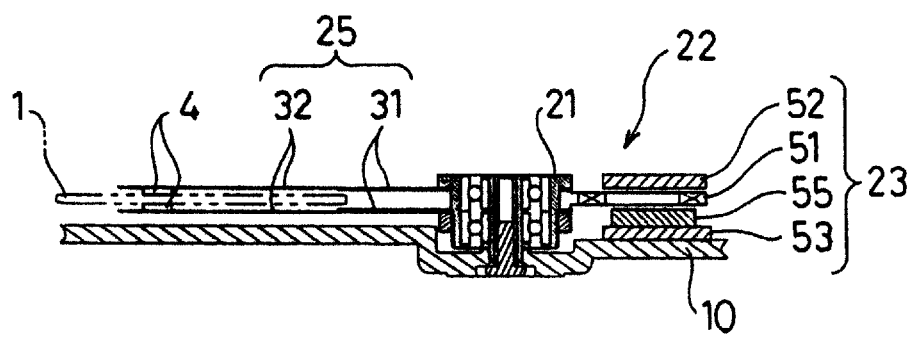
FIG. 2 is a sectional view on the line A—A of FIG. 1 of the embodiment.
Figure 3:
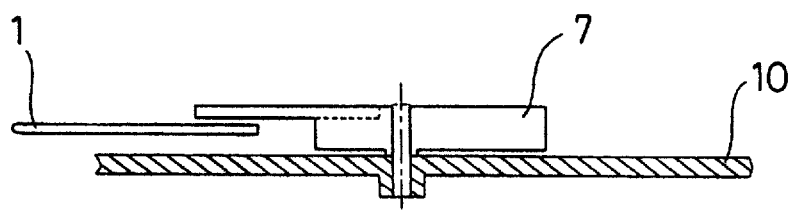
FIG. 3 is a view taken in a direction of an arrow B of FIG. 1 of the embodiment.

In FIG. 1, a top cover is removed and an upper yoke is omitted.

The disk drive system comprises a disk 1 such as a magnetic disk which is a recording medium of data, a spindle motor 2 for rotatably driving the disk 1, an actuator 22 mounted with sliders 4, a voice coil motor 23 for oscillatably driving the actuator 22, a ramp block 6 provided in a parking position of the actuator 22, an inertial arm 7 which is a latching mechanism of the actuator according to the present invention, and the like housed in a casing 10.

The disk drive system is provided with a loading/unloading mechanism of the actuator 22 and an inertial latching mechanism, and the actuator 22 is unloaded to the parking position when the disk drive system stops operation and held in the parking position during non-operation of the disk drive system.

The disk 1 is fixed to a rotor of the spindle motor 2. The disk 1 is rotatably driven around a spindle axis of the spindle motor 2 during operation of the disk drive system, and stops rotation (rests) during non-operation of the disk drive system. Arranged concentrically on a surface of the disk 1 is an unshown track in which data and servo information are recorded. One piece of disk 1 is provided in this embodiment, but two or more disks 1 may be provided.

The actuator 22 has a head arm 25 and a coil arm 26 and is oscillatably supported around an oscillatory axis of a pivot bearing 21. The head arm 25 has a carriage arm 31 and a suspension arm 32 suspended by the carriage arm 31. The suspension arm 32 has a tab 35 used in shunting to the ramp block 6. The tab 35 is held by the ramp block 6 when the head arm 25 is moved to the parking position. The tab 35 is formed with a projection (not shown) which makes contact with the ramp block 6. The suspension arm 32 is mounted with the sliders 4.

The sliders 4 are mounted on the head arm 25 so as to respectively face upper and lower surfaces of the disk 1 and connected to an unshown controller by a head wire 41 or the like. The sliders 4 are provided with head elements (not shown) which record the data from the controller in the track on the surface of the disk 1, and read and send the data recorded in the track to the controller.

The voice coil motor 23 comprises a coil 51 mounted on an inner surface of the coil arm 26, an upper yoke 52 and a lower yoke 53, a permanent magnet 55 attached on an upper surface of the lower yoke 53, and the like. The unshown controller supplies driving current for the coil 51. The coil arm 26 is arranged in a space between the upper yoke 52 and lower yoke 53. The coil arm 26 partly engages an inertial arm 7 described below.

The ramp block 6 has an unshown compound surface formed from an inclined surface and a flat surface relative to the tab 35 and is fixed in the casing 10 in such a manner that the compound surface is arranged in a moving direction of the tab 35, namely outwardly in a diametric direction of the disk 1, involved in oscillation of the suspension arm 32 when unloading.

The actuator 22, voice coil motor 23 and ramp block 6 constitute the loading/unloading mechanism.

The inertial arm 7 is rotatably supported by the casing 10 (see FIG. 3) and partly engages the coil arm 26 as shown in FIG. 1. In this embodiment, engaging part of the coil arm 26 and inertial arm 7 are shaped in involute which is generally used for gears and the coil arm 26 and inertial arm 7 are in meshing engagement.

Fixed to the inertial arm 7 is an attractable member 8 which is energizing means made of a magnetic material and attracted by the permanent magnet 55 to clockwise energize and hold the inertial arm 7 when loading as described below.

Description in light of dynamics will be made below in respect of holding the actuator 22 at the time of the shock, which is an object of the present invention.

Figure 4:
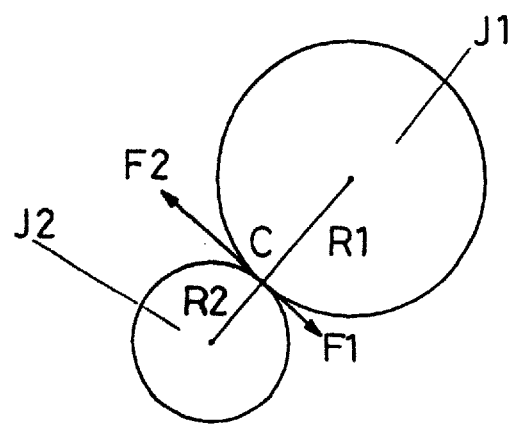
FIG. 4 is a schematic view showing a dynamic relationship between an actuator and an inertial arm of the embodiment.

FIG. 4 shows a dynamic relationship between the actuator and inertial arm engaged. Both engaged are rotatably supported and it can be easily understood that they rotate in opposite directions. In this figure, reference characters and numerals J1 and J2 respectively denote inertia of the actuator 22 and inertial arm 7, R1 and R2; distances to a meshing point C, F1 and F2; forces applied on the meshing point; and T1 and T2; torques produced, supposing that a rotational shock with angular acceleration b is externally applied.

The relationship between the actuator 22 and inertial arm 7 when the inertial arm 7 is operated against the rotation of the actuator 22 by the rotational shock can be represented by the following formulas.

$$T1 = F1 \times R1 = J1 \times b \quad (1)$$

$$F1 = J1 \times b / R1 \quad (2)$$

$$T2 = F2 \times R2 = J2 \times b \quad (3)$$

$$F2 = J2 \times b / R2 \quad (4)$$

$$J1 \times b / R1 = J2, b / R2 \quad (5)$$

$$J2 = (R2/R1) \times J1 \quad (6)$$

Accordingly, in this embodiment, the actuator 22 and inertial arm 7 have a ratio of inertia of 1.7 to 1 and a ratio of distances to the meshing point of 1.7 to 1 (the ratio of the inertia of the actuator 22 and inertial arm 7 is made equal to the ratio of the distance from a center of rotation of the actuator 22 to the engaging part and the distance from the center of rotation of the inertial arm 7 to the engaging part).

The actuator 22 and inertial arm 7 have balanced mass with respect to respective centers of rotation so that influence of linear acceleration at the time of the shock is restrained as much as possible.

Mode of operation of the disk drive system configured as mentioned above will be described with reference to FIGS. 5 to 7.

The controller applies the driving current to the coil 51 of the voice coil motor 23 when the disk drive system stops operation and unloads the head arm 25 of the actuator 22 to the parking position.

Figure 5:
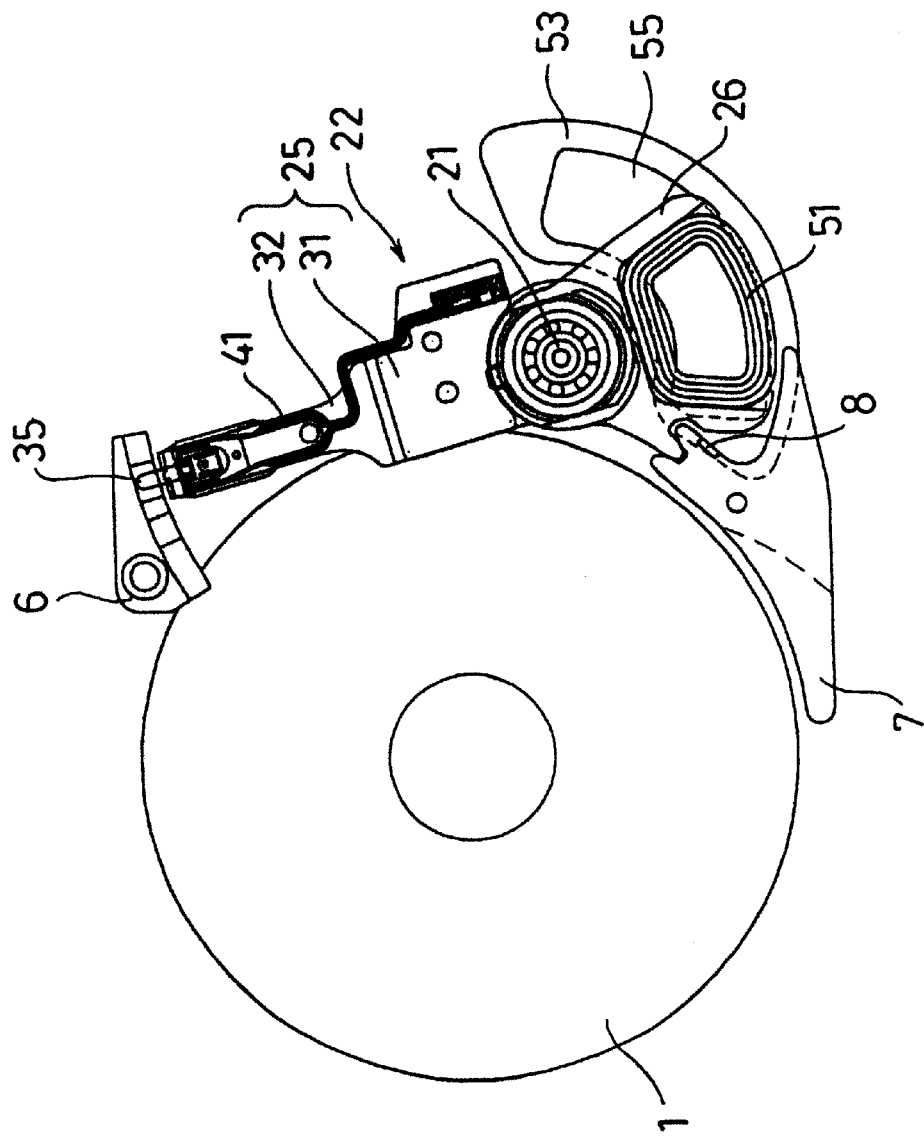
FIG. 5 is an explanatory view of operation of the disk drive system of the embodiment.
Figure 6:
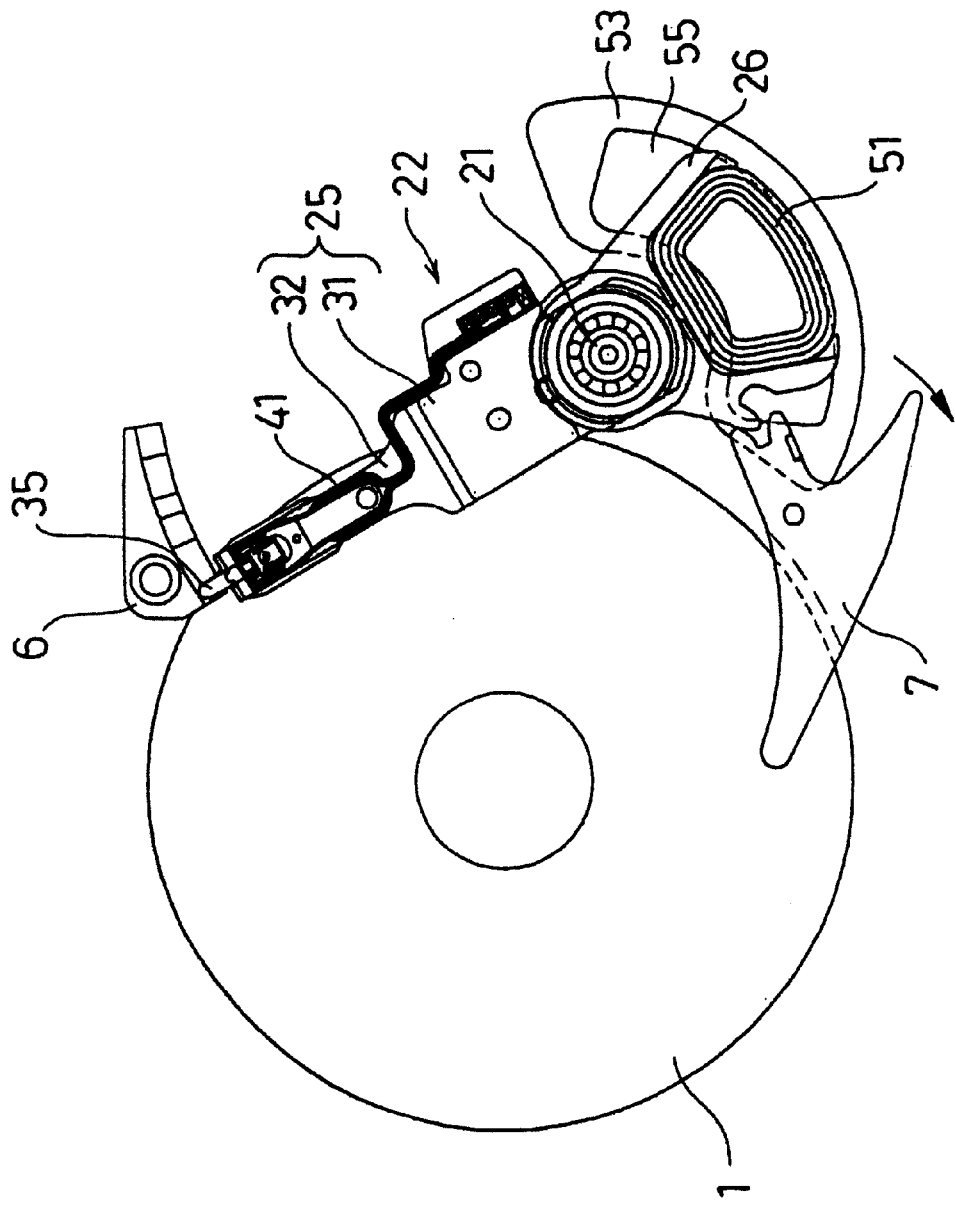
FIG. 6 is an explanatory view of the operation of the disk drive system of the embodiment.

FIG. 5 shows a condition of the head arm 25 unloaded to the parking position, where the coil arm 26 engages the inertial arm 7. When the head arm 25 is in the parking position, the tab 35 of the suspension arm 32 is held by the ramp block 6. The disk 1 rests. Then, when the disk drive system starts operation, the head arm 25 is loaded form the parking position so as to move the slider 4 on the surface of the disk 1 which starts rotational operation and the slider 4 is further moved to the desired data track on the basis of the servo data read by the head element (not shown) of the slider 4. FIG. 6 shows a condition just before the slider 4 comes close to the disk 1 (or just after coming apart from the disk 1), where the engagement between the coil arm 26 and inertial arm 7 is released.

Figure 7:
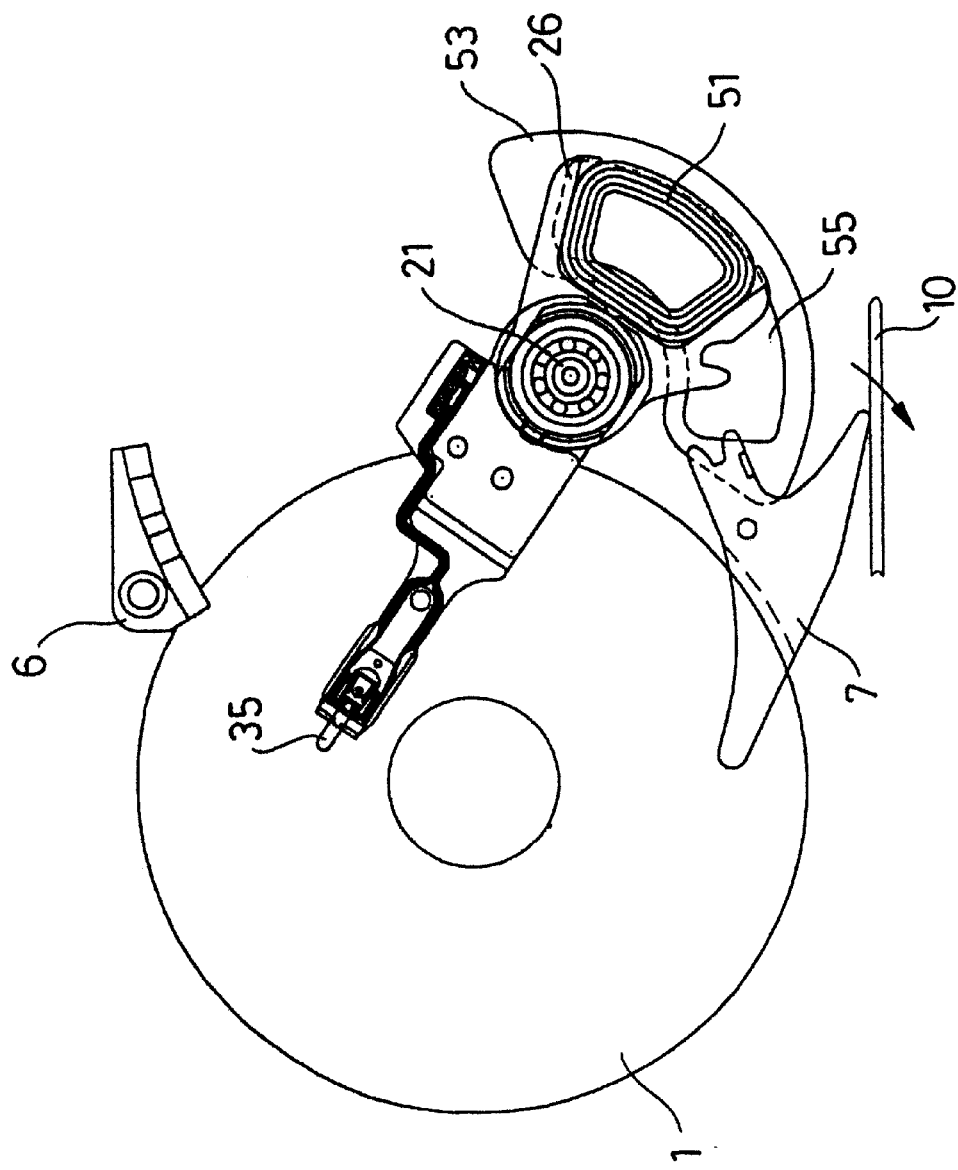
FIG. 7 is an explanatory view of the operation of the disk drive system of the embodiment.

FIG. 7 shows a loading condition, where the engagement between the coil arm 26 and inertial arm 7 is released. In both conditions, the inertial arm 7 is clockwise energized by the attractable member 8 attracted by the permanent magnet 55, and its position is limited by the casing 10.

Next, description will be made with reference to FIG. 5 in respect of the operation of the actuator 22 and inertial arm 7 when the rotational shock is externally applied on the disk drive system during non-operation.

In FIG. 5, when the rotational shock is counterclockwise applied, a force is applied which counterclockwise rotates the actuator 22 at a predetermined angular acceleration. On the other hand, a similar force of counterclockwise rotation is also applied on the inertial arm 7. Therefore, the forces in opposite directions are applied on the engaging part. As described above, the inertia and the distance from the engaging part of the inertial arm 7 are preset in order to counteract the force applied on the actuator 22 by the rotational shock (in FIG. 5, the ratio of the inertia of the actuator 22 and inertial arm 7 is made equal to the ratio of the distance from the center of rotation of the actuator 22 to the engaging part and the distance from the center of rotation of the inertial arm 7 to the engaging part). Accordingly, the torque produced at the engaging part on each of the actuator 22 and inertial arm 7 becomes equal so that the actuator 22 and inertial arm 7 mutually restrain their operations at the engaging part. Namely, the oscillation of the actuator 22 by the rotational shock to be moved to the surface of the disk 1 can be avoided.

When the rotational shock is clockwise applied, the clockwise force is similarly applied on the actuator 22 and inertial arm 7 at a predetermined angular acceleration, which produces forces in the opposite directions at the engaging part. The torque produced on each of the actuator 22 and inertial arm 7 at the engaging part is equal and the actuator 22 and inertial arm 7 mutually restrain their operation at the engaging part. Namely, the oscillation of the actuator 22 by the rotational shock to be moved to the surface of the disk 1 can be avoided.

As described above, according to the present embodiment, there is provided the inertial arm rotatably supported, engaging the actuator when the head arm is in or near the parking position and releasing the engagement with the actuator when the head arm is in or near a position close to the disk recording medium and energizing means for holding a position of the inertial arm by a magnetic attracting force in a position where the engagement with the actuator is released. According to this, even if the rotational shock is externally applied when the actuator remains in the parking position, moment of rotation is applied on each of the actuator and inertial arm in the same direction and the actuator and inertial arm mutually restrain their operations at the engaging part. Accordingly, the oscillation of the actuator to a data area can be avoided. Further, when loading, the position of the inertial arm is held by the magnetic attracting force as the energizing means in the position where the engagement with the actuator is released so that the release of the engagement and mode of operation of the engagement between the actuator and inertial arm when loading/unloading can be surely achieved.

The energizing means of this embodiment achieves holding the position of the inertial arm by the magnetic attracting force of the permanent magnet and attractable member, alternatively, it can be also achieved by energizing the inertial arm using, for example, a spring material or elastic transformation of resin.

(Embodiment 2)

Figure 8:
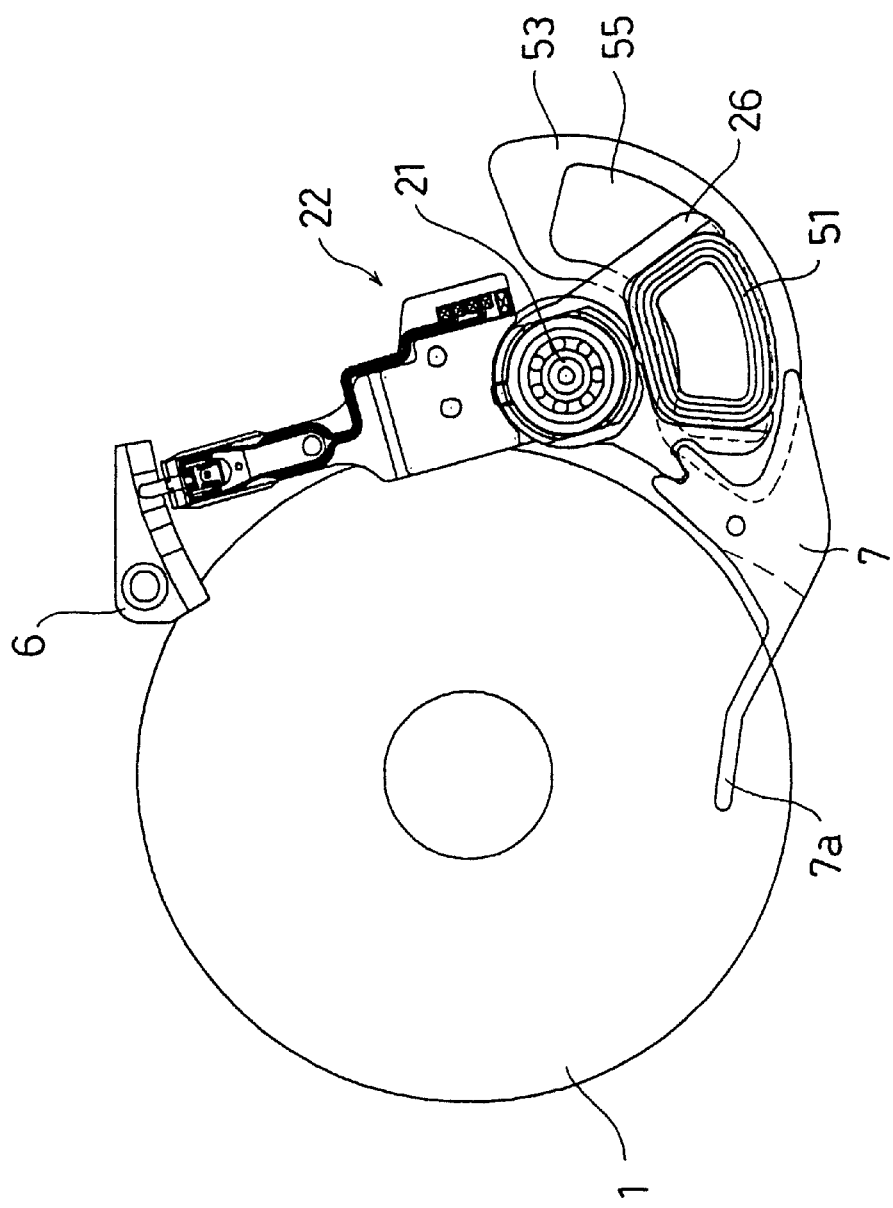
FIG. 8 is an explanatory view of the operation of the disk drive system of (Embodiment 2) of the present invention.
Figure 9:
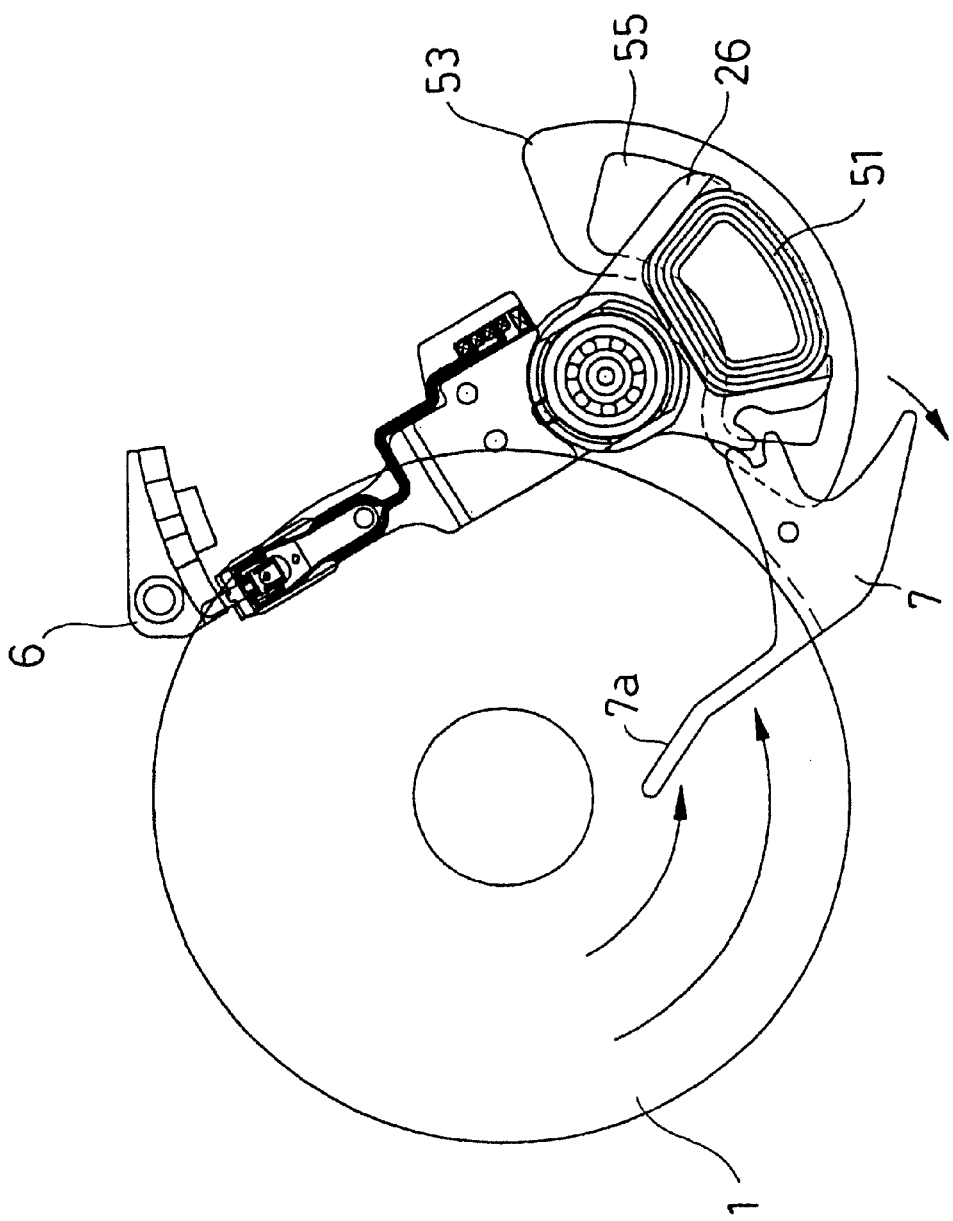
FIG. 9 is an explanatory view of the operation of the disk drive system of the embodiment.
Figure 10:
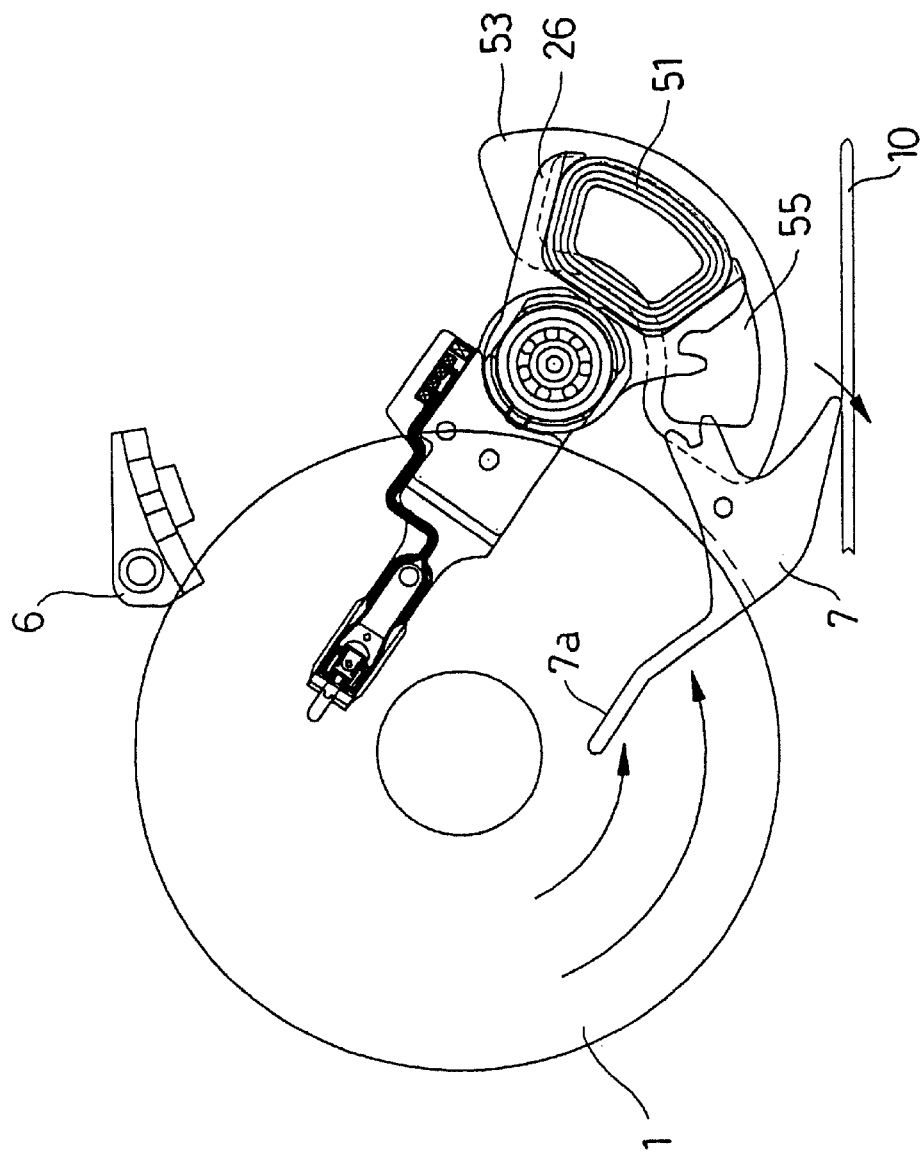
FIG. 10 is an explanatory view of the operation of the disk drive system of the embodiment.

FIGS. 8 to 10 show (Embodiment 2) of the present invention.

In FIG. 8, the disk 1, spindle motor 2, slider 4, actuator 22, voice coil motor 23, ramp block 6, casing 10, head arm 25, coil arm 26, pivot bearing 21, carriage arm 31, suspension arm 32, tab 35, head wire 41, coil 51, upper yoke 52, lower yoke 53 and permanent magnet 55 have the same configurations as shown in FIG. 1. Difference from the configuration in FIG. 1 is that the inertial arm 7 is integrally formed with a wind receiver 7a for receiving a force of air flow produced by rotation of the disk 1.

Mode of operation of the disk drive system configured as mentioned above will be described below.

When the disk drive system starts operation, the unshown controller actuates the spindle motor 2 to rotate the disk 1. Then, the driving current is applied to the coil 51 of the voice coil motor 23, the head arm 25 is loaded form the parking position so as to move the slider 4 on the surface of the disk 1 which starts rotational operation and the slider 4 is further moved to the desired data track on the basis of the servo data read by the head element (not shown) of the slider 4. The wind receiver 7a formed on the inertial arm 7 receives the force of air flow produced at the same time as the rotation of the disk 1, and the inertial arm 7 itself is clockwise energized, and its position is defined by the casing 10.

FIG. 9 shows a condition just before the slider 4 comes close to the disk 1 (or just after coming apart from the disk 1), where the engagement between the coil arm 26 and inertial arm 7 is released. FIG. 10 shows a loading condition, where the engagement between the coil arm 26 and inertial arm 7 is released.

Then, the controller applies the driving current to the coil 51 of the voice coil motor 23 when the disk drive system stops operation and unloads the head arm 25 of the actuator 22 to the parking position. FIG. 8 shows a condition of the head arm 25 unloaded to the parking position, where the coil arm 26 engages the inertial arm 7. When the head arm 25 is in the parking position, the tab 35 of the suspension arm 32 is held by the ramp block 6. The disk 1 rests.

Next, description will be made with reference to FIG. 8 in respect of the operation of the actuator 22 and inertial arm 7 when the rotational shock is externally applied on the disk drive system during non-operation.

In FIG. 8, when the rotational shock is counterclockwise applied, a force is applied which counterclockwise rotates the actuator 22 at a predetermined angular acceleration. On the other hand, a similar force of counterclockwise rotation is also applied on the inertial arm 7. Therefore, the forces in opposite directions are applied on the engaging part. As described above, the inertia and the distance from the engaging part of the inertial arm 7 are preset in order to counteract the force applied on the actuator 22 by the rotational shock (in FIG. 8, the ratio of inertia of the actuator 22 and inertial arm 7 is made equal to the ratio of the distance from the center of rotation of the actuator 22 to the engaging part and the distance from the center of rotation of the inertial arm 7 to the engaging part). Accordingly, the torque produced at the engaging part on each of the actuator 22 and inertial arm 7 becomes equal so that the actuator 22 and inertial arm 7 mutually restrain their operations at the engaging part.

Namely, the oscillation of the actuator 22 by the rotational shock to be moved to the surface of the disk 1 can be avoided. When the rotational shock is clockwise applied, the clockwise force is similarly applied on the actuator 22 and inertial arm 7 at a predetermined angular acceleration, which produces the force mutually counteracting. The torque produced on each of the actuator 22 and inertial arm 7 at the engaging part is equal and the actuator 22 and inertial arm 7 mutually restrain their operation at the engaging part. Namely, the oscillation of the actuator 22 by the rotational shock to be moved to the surface of the disk 1 can be avoided.

As described above, according to the present embodiment, there is provided the inertial arm rotatably supported, engaging the actuator when the head arm is in or near the parking position, releasing the engagement with the actuator when the head arm is in or near the position close to the disk recording medium and having a wind receiver for receiving a force of air flow produced by rotation of the disk recording medium. According to this, even if the rotational shock is externally applied when the actuator remains in the parking position, the moment of rotation is applied on both of the actuator and inertial arm in the same direction and the actuator and inertial arm mutually restrain their operations at the engaging part. Accordingly, the oscillation of the actuator to the data area can be avoided. Further, when loading, the wind receiver receives the force of air flow produced by the rotation of the disk recording medium so that the force is always applied on the inertial arm in a direction of releasing the engagement with the actuator. Therefore, the position of the inertia arm is held without the energizing means using the magnetic attracting force according to (Embodiment 1) of the present invention, and the release of the engagement and mode of operation of the engagement between the actuator and inertial arm when loading/unloading can be surely achieved.

(Embodiment 3)

Figure 11:
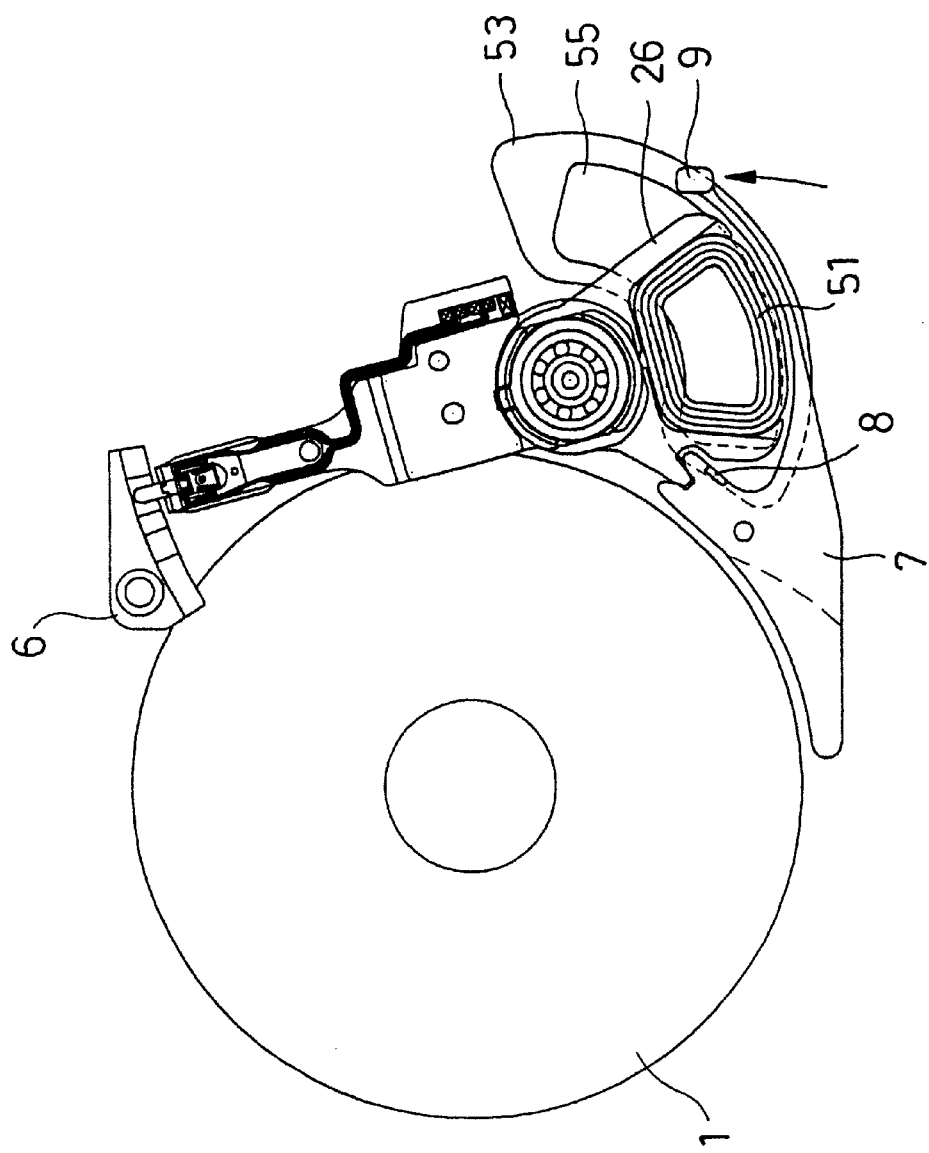
FIG. 11 is an explanatory view of the operation of the disk drive system of (Embodiment 3) of the present invention.
Figure 12:
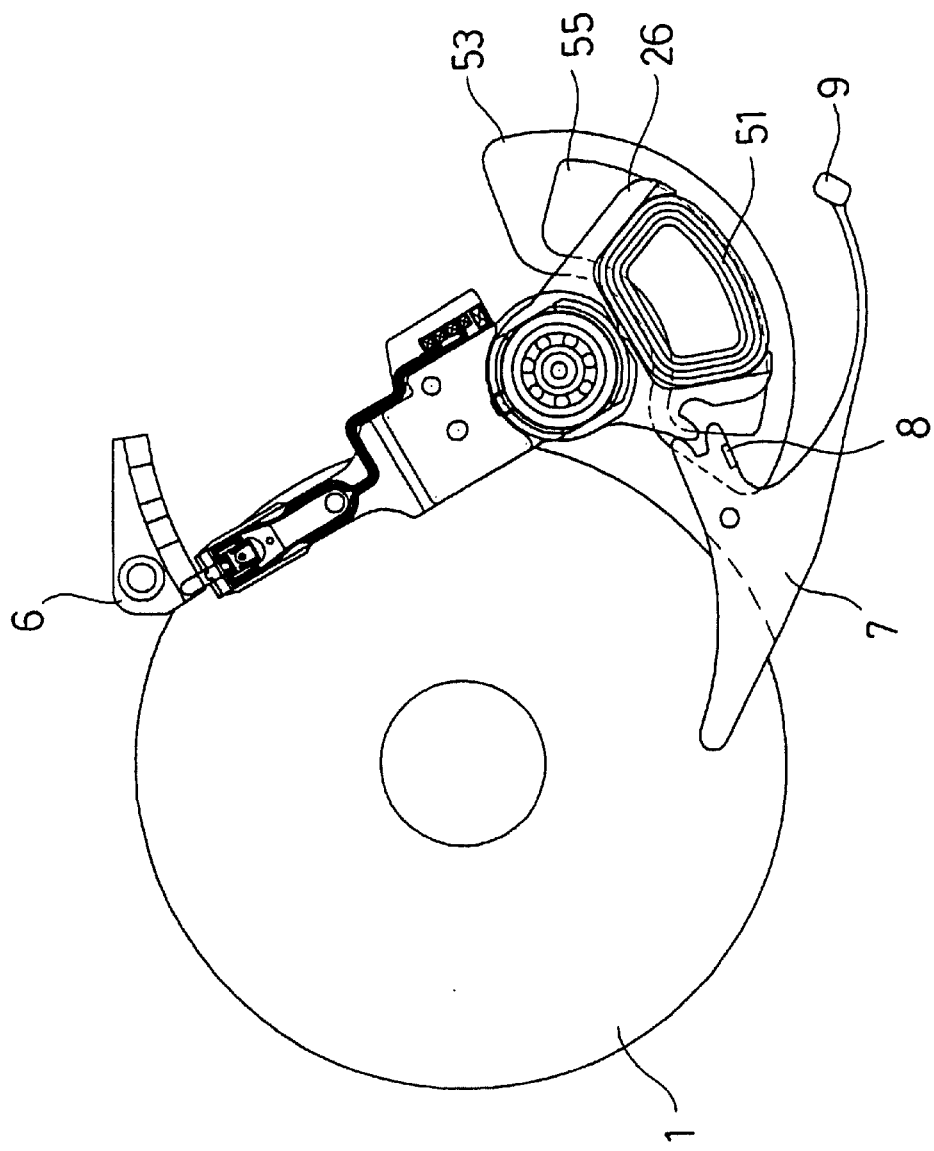
FIG. 12 is an explanatory view of the operation of the disk drive system of the embodiment.
Figure 13:
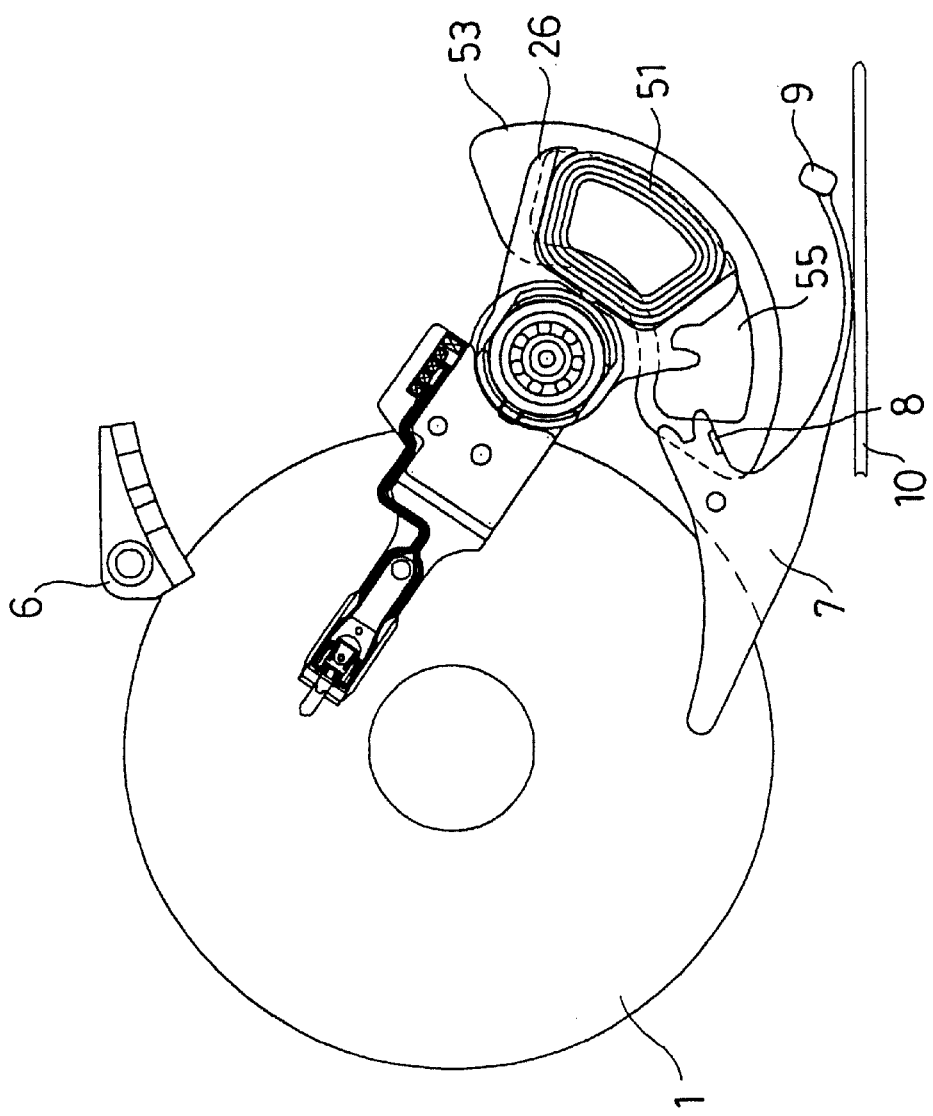
FIG. 13 is an explanatory view of the operation of the disk drive system of the embodiment.

FIGS. 11 to 13 show (Embodiment 3) of the present invention.

In FIG. 11, the disk 1, spindle motor 2, slider 4, actuator 22, voice coil motor 23, ramp block 6, casing 10, head arm 25, coil arm 26, pivot bearing 21, carriage arm 31, suspension arm 32, tab 35, head wire 41, coil 51, upper yoke 52, lower yoke 53, permanent magnet 55, inertial arm 7, and attractable member 8 as first holding means have the same configurations as shown in FIG. 1. Difference from the configuration in FIG. 1 is that a second attractable member 9 as second holding means is fixed to the inertial arm 7.

The second holding means is constituted by the permanent magnet 55 and second attractable member 9 and when the actuator 22 is in the parking position, the second attractable member 9 made of a magnetic material always holds the actuator 22 by being attracted by the permanent magnet 55 to counterclockwise energize and hold the inertial arm 7.

Mode of operation of the disk drive system configured as mentioned above will be described below.

The unshown controller applies the driving current to the coil 51 of the voice coil motor 23 when the disk drive system stops operation and unloads the head arm 25 of the actuator 22 to the parking position. FIG. 11 shows the condition of the head arm 25 unloaded to the parking position, where the coil arm 26 engages the inertial arm 7. When the head arm 25 is in the parking position, the tab 35 of the suspension arm 32 is held by the ramp block 6. The disk 1 rests.

The inertial arm 7 is counterclockwise energized by the second attractable member 9 attracted by the permanent magnet 55, and the actuator 22 is held in the parking position. Then, when the disk drive system starts operation, the head arm 25 is loaded form the parking position so as to move the slider 4 on the surface of the disk 1 which starts rotational operation and the slider 4 is further moved to the desired data track on the basis of the servo data read by the head element (not shown) of the slider 4.

FIG. 12 shows a condition just before the slider 4 comes close to the disk 1 (or just after coming apart from the disk 1), where the engagement between the coil arm 26 and inertial arm 7 is released.

FIG. 13 shows a loading condition, where the engagement between the coil arm 26 and inertial arm 7 is released. In both conditions, the inertial arm 7 is clockwise energized by the attractable member 8 attracted by the permanent magnet 55, and its position is defined by the casing 10. The attracting force between the attractable member 8 and permanent magnet 55 when loading is arranged to be larger than the same between the attractable member 9 and permanent magnet 55 so that the inertial arm 7 is not counterclockwise energized when loading.

Next, description will be made in respect of the operation of the actuator 22 and inertial arm 7 when a slight rotational shock is externally applied on the disk drive system during non-operation.

The inertial arm 7 is rotatably supported by the casing 10 as described above, but a sliding loss inevitably occurs because of sliding with a support shaft during rotation. The inertial arm 7 may also vary during manufacture. Therefore, the inertial arm 7 is expected not to operate against the slight shock though it operates against the relatively large shock with no bars. In FIG. 11, when the slight rotational shock is counterclockwise applied, the force is applied which counterclockwise rotates the actuator 22 at a predetermined angular acceleration. On the other hand, for the reason mentioned above, even if the force of rotation is not counterclockwise applied on the inertial arm 7, the position of the inertial arm 7 is held by the attracting force between the second attractable member 9 and permanent magnet 55. The actuator 22 and inertial arm 7 are in engagement, which holds the position of the actuator 22. Similarly when the slight rotational shock is clockwise applied, even if the force of rotation is not clockwise applied on the inertial arm 7, the position of the inertial arm 7 is held by the attracting force between the second attractable member 9 and permanent magnet 55. The actuator 22 and inertial arm 7 are in an engaging condition, which holds the position of the actuator 22. Accordingly, the oscillation of the actuator 22 by the slight rotational shock to be moved to the surface of the disk 1 can be avoided.

As described above, according to the present embodiment, providing the second holding means for holding the actuator or inertial arm permits always holding the position of the actuator against the slight rotational shock which occurs in the parking position. Namely, the oscillation of the actuator to the data area can be avoided even when the slight rotational shock is applied against which the inertial arm does not operate.

(Embodiment 4)

Figure 14:
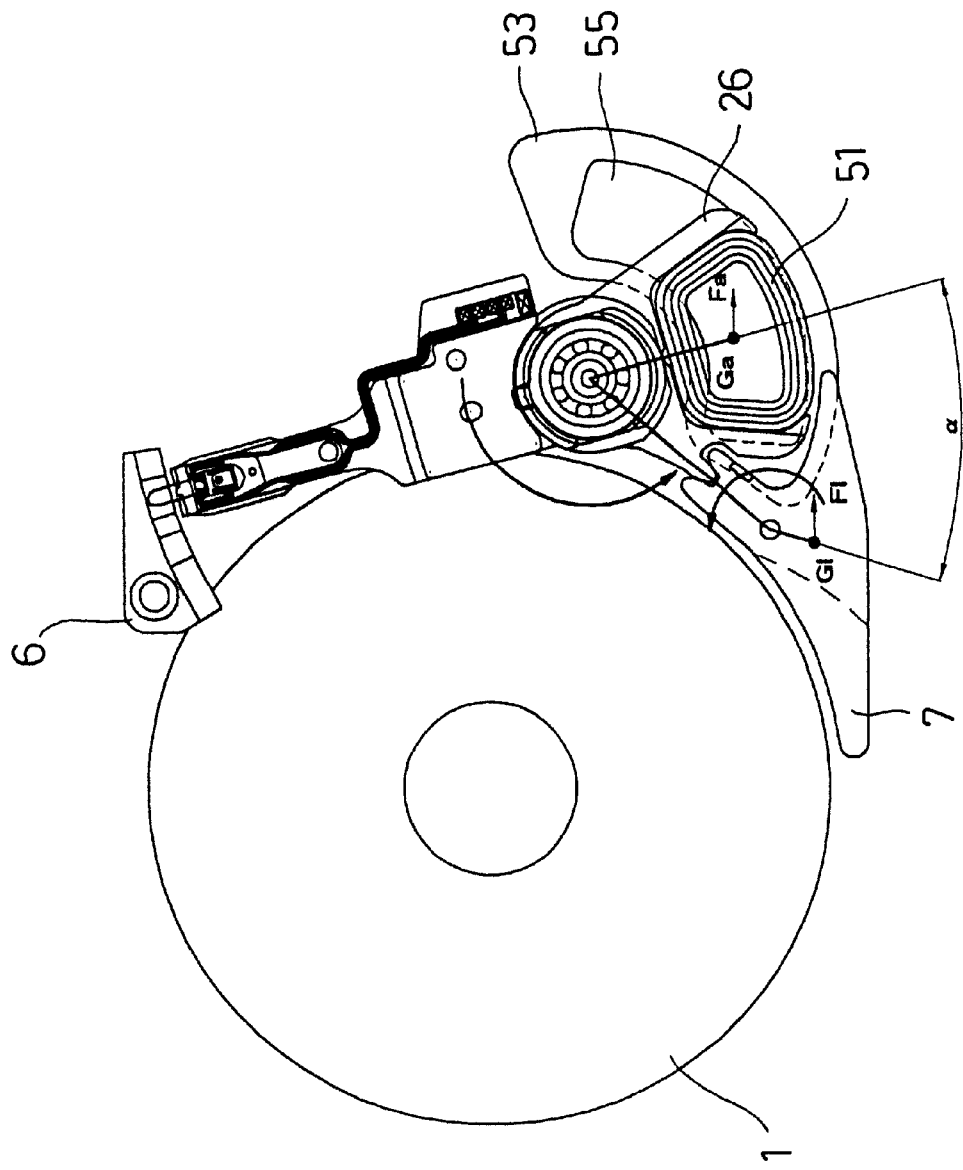
FIG. 14 is an explanatory view of the operation of the disk drive system of (Embodiment 4) of the present invention.
Figure 15:
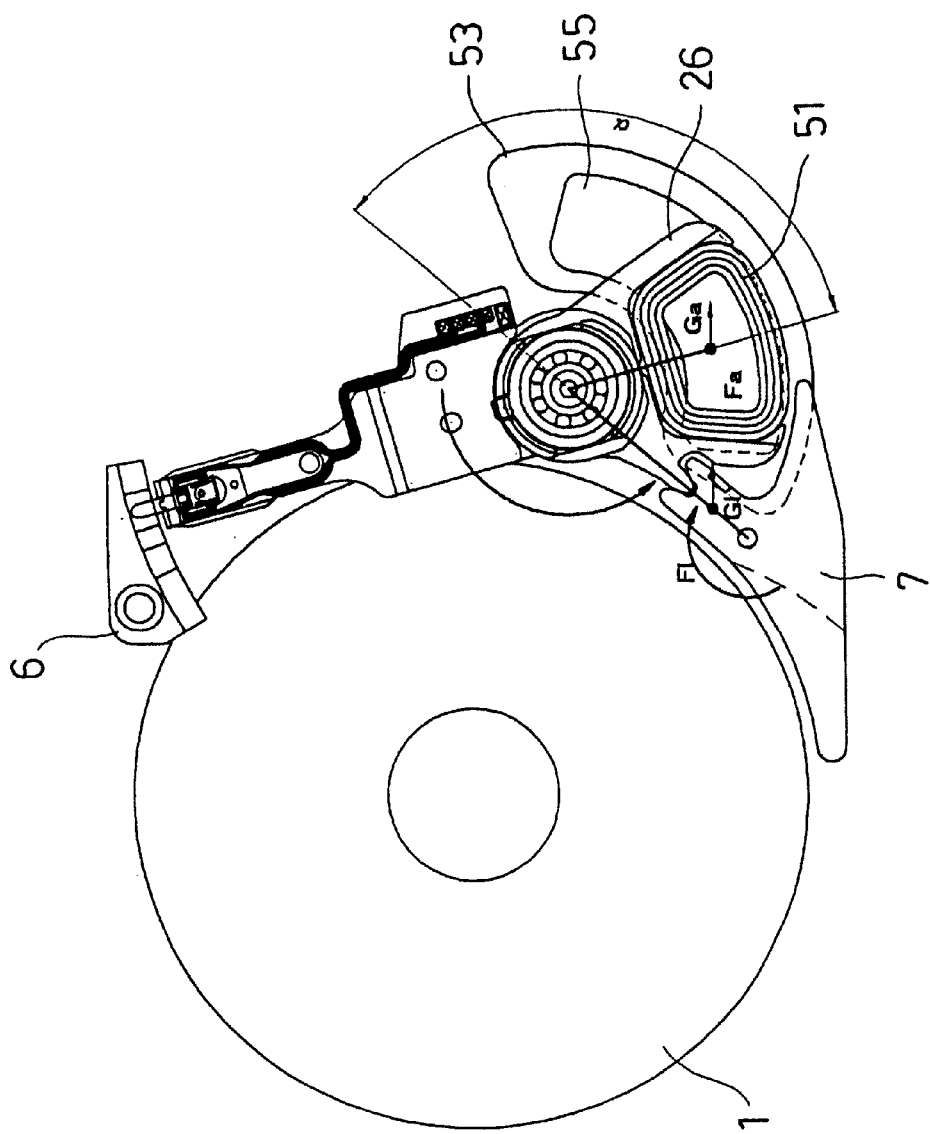
FIG. 15 is an explanatory view of the operation of the disk drive system of the embodiment.

FIGS. 14 and 15 show a latching mechanism in the disk drive system according to the present invention. In FIG. 14, the disk 1, spindle motor 2, slider 4, voice coil motor 23, ramp block 6, casing 10, head arm 25, coil arm 26, pivot bearing 21, carriage arm 31, suspension arm 32, tab 35, head wire 41, coil 51, upper yoke 52, lower yoke 53, permanent magnet 55 have the same configurations as shown in FIG. 1. Difference from the configuration in FIG. 1 is that a position of a mass center of gravity of the actuator 22 is offset relative to a center of the pivot bearing 21 (a point Ga in FIG. 14), and a position of a mass center of gravity of the inertial arm 7 is also offset relative to the center of rotation (a point G1 in FIG. 14). Further, a line connecting the center of rotation and the mass center of gravity Ga of the actuator 22 makes an acute angle a with a line connecting the center of rotation and the mass center of gravity G1 of the inertial arm 7.

Mode of operation of the disk drive system configured as mentioned above will be described below.

A component such as the actuator 22 oscillatably provided on the oscillatory axis is generally accelerated linearly and angularly by the external shock applied to the disk drive system. A force by the linear acceleration (a translational force) is applied on the mass center of gravity Ga of the actuator 22 and a force by the angular acceleration (a couple of force) is applied on the center of the pivot bearing 21. The mass center of gravity is designed to be situated in the center of the pivot bearing 21, but to be exact, it is offset due to limitation in design or variation in manufacture. When the position of the mass center of gravity is offset from the center of rotation, the force of rotation is applied on the actuator 22 by the external shock (the linear acceleration). This will be described with respect to FIG. 15.

In FIG. 15, the line connecting the center of rotation and the mass center of gravity Ga of the actuator 22 makes an obtuse angle a with the line connecting the center of rotation and the mass center of gravity G1 of the inertial arm 7. Supposing that the linear acceleration Fa and F1 is applied on the actuator 22 and inertial arm 7, the force by the linear acceleration is applied on the mass center of gravity so that the forces of rotation are counterclockwise applied on the actuator 22 and clockwise applied on the inertial arm 7. Accordingly, the operation of the actuator cannot be restrained, which cannot avoid the oscillation of the actuator to the data area.

On the other hand, in the embodiment of the present invention, the line connecting the center of rotation and the mass center of gravity Ga of the actuator 22 makes the acute angle a with the line connecting the center of rotation and the mass center of gravity G1 of the inertial arm 7 as shown in FIG. 14. Supposing that the linear acceleration Fa and F1 is applied on the actuator 22 and inertial arm 7, the force by the linear acceleration is applied on the mass center of gravity so that the force of rotation is counterclockwise applied on each of the actuator and inertial arm 7. Accordingly, the operation of the actuator can be restrained, which can avoid the oscillation of the actuator to the data area. The description on the operation against the angular acceleration by the external shock has been already made and is omitted here.

As described above, according to the present invention, in the parking position, the line connecting the center of rotation and the mass center of gravity of the actuator makes the acute angle with the line connecting the center of rotation and the mass center of gravity of the inertial arm, which can substantially equalize the direction of the moment of rotation by the linear acceleration applied on each of the actuator and inertial arm. Accordingly, not only a rotational shock but also the operation of the actuator relative to the linear acceleration applied on the mass center of gravity can be restrained, and the oscillation of the actuator to the data area can be avoided.

(Embodiment 5)

Figure 16:
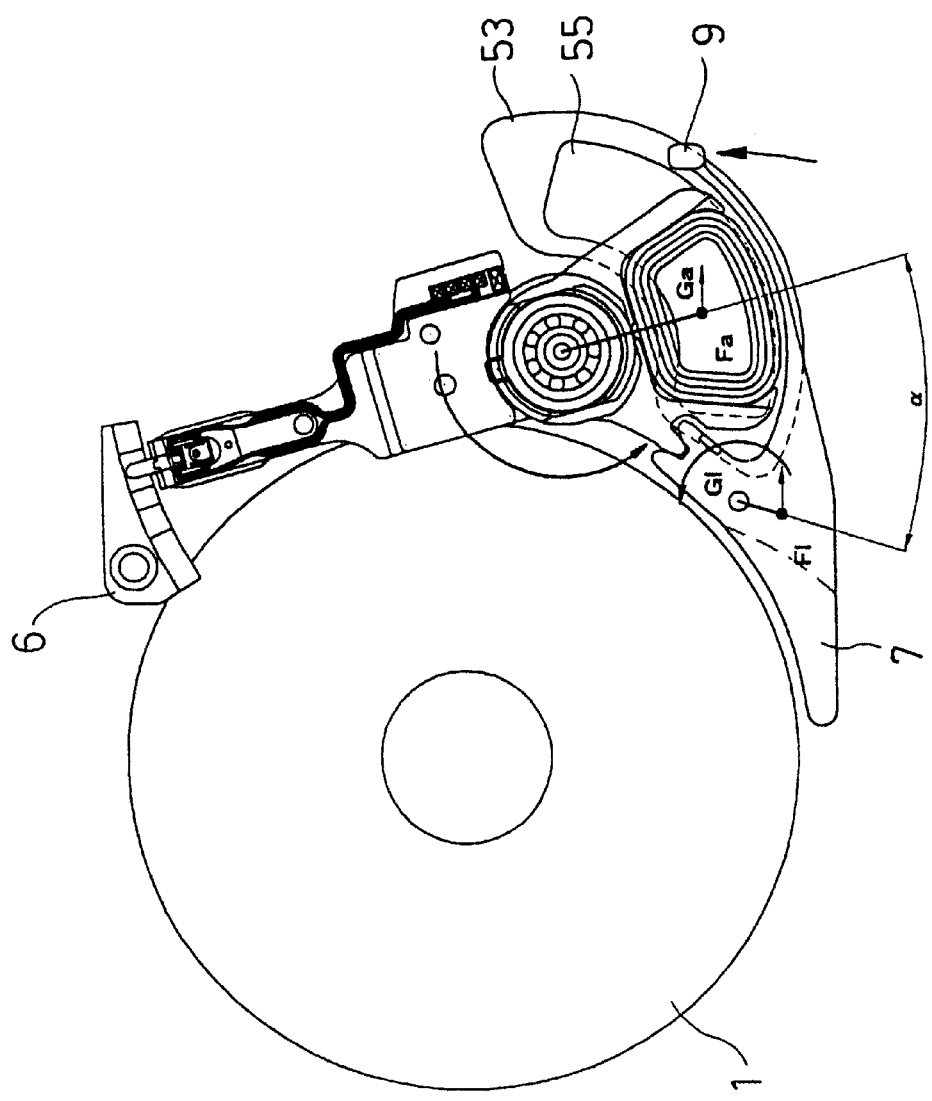
FIG. 16 is an explanatory view of the operation of the disk drive system of (Embodiment 5) of the present invention.
Figure 17:
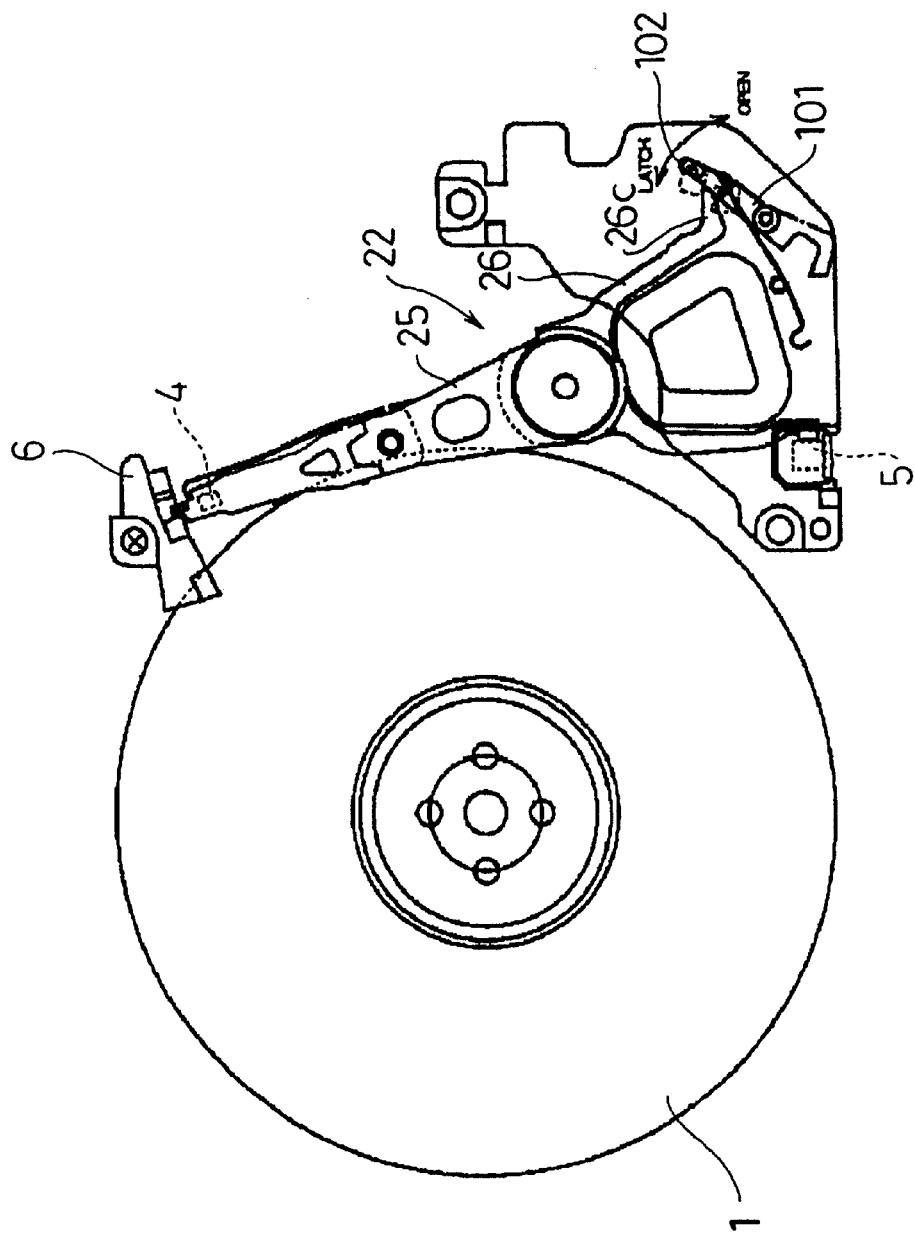
FIG. 17 is a view showing a configuration of a conventional inertial latching mechanism.
Figure 18:
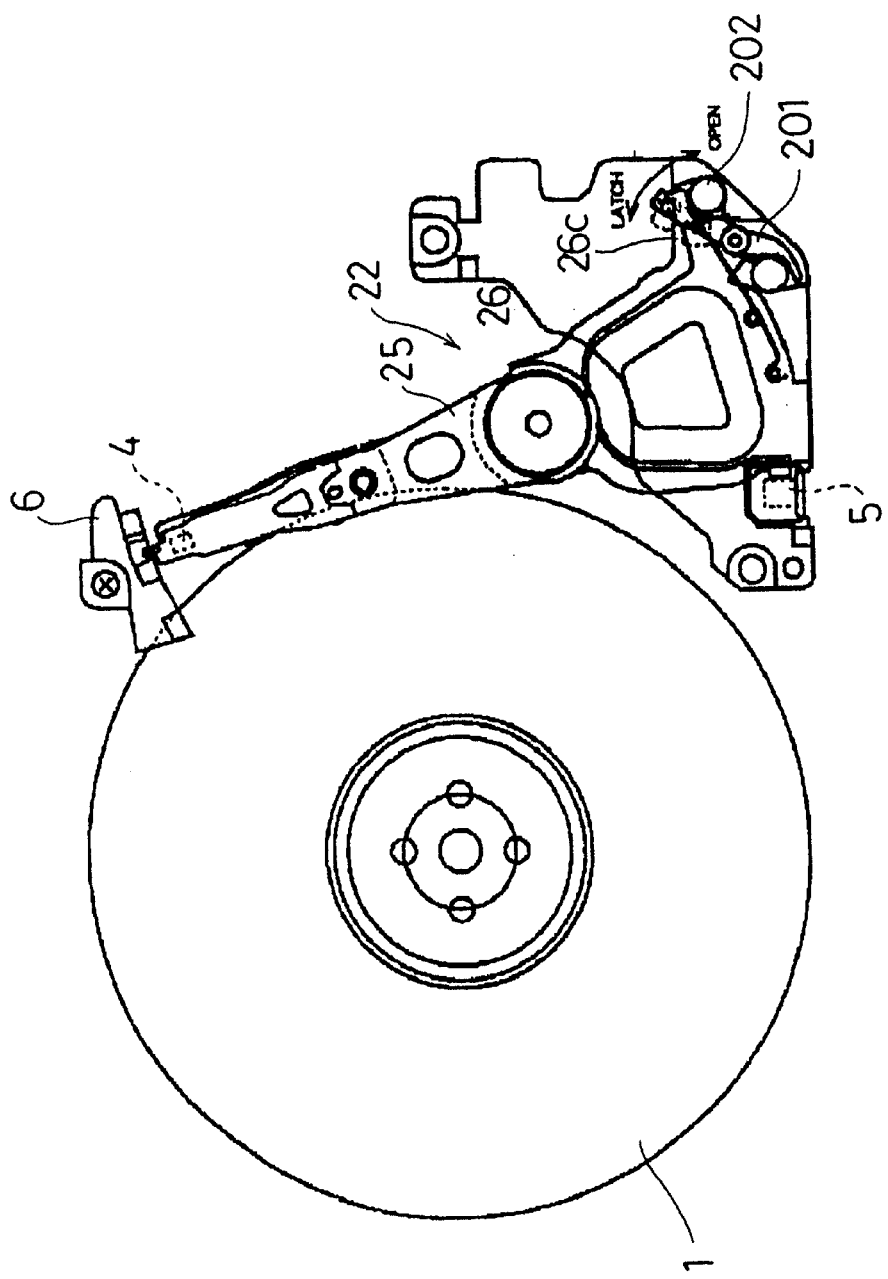
FIG. 18 is a view showing a configuration of the conventional inertial latching mechanism.

FIGS. 16 shows (Embodiment 5) of the present invention.

In FIG. 16, the disk 1, spindle motor 2, slider 4, voice coil motor 23, ramp block 6, casing 10, head arm 25, coil arm 26, pivot bearing 21, carriage arm 31, suspension arm 32, tab 35, head wire 41, coil 51, upper yoke 52, lower yoke 53, permanent magnet 55, and attractable member 8 as the first holding means have the same configurations as shown in FIG. 14. Difference from the configuration in FIG. 14 is that the second attractable member 9 as second holding means is fixed to the inertial arm 7. The second holding means is constituted by the permanent magnet 55 and second attractable member 9 and when the actuator 22 is in the parking position, the second attractable member 9 made of the magnetic material always holds the actuator 22 by being attracted by the permanent magnet 55 to counterclockwise energize and hold the inertial arm 7.

Mode of operation of the disk drive system configured as mentioned above will be described below.

FIG. 16 shows the condition of the head arm 25 unloaded to the parking position, where the coil arm 26 engages the inertial arm 7. The inertial arm 7 is counterclockwise energized by the second attractable member 9 attracted by the permanent magnet 55, and the actuator 22 is held in the parking position.

Description will be made in respect of the operation of the actuator 22 and inertial arm 7 when the slight rotational shock is externally applied on the disk drive system during non-operation. The inertial arm 7 is rotatably supported by the casing 10 as described above, but the sliding loss inevitably occurs because of sliding with the support shaft during rotation. The inertial arm 7 may also vary during manufacture. Therefore, the inertial arm 7 is expected not to operate against the slight shock though it operates against the relatively large shock with no bars. In FIG. 16, when the slight rotational shock is counterclockwise applied, the force is applied which counterclockwise rotates the actuator 22 at the predetermined angular acceleration. On the other hand, for the reason mentioned above, even if the force of rotation is not counterclockwise applied on the inertial arm 7, the position of the inertial arm 7 is held by the attracting force between the second attractable member 9 and permanent magnet 55. The actuator 22 and inertial arm 7 are in engagement, which holds the position of the actuator 22. When the slight rotational shock is clockwise applied, even if the force of rotation is not clockwise applied on the inertial arm 7, the position of the inertial arm 7 is held by the attracting force between the second attractable member 9 and permanent magnet 55. The actuator 22 and inertial arm 7 are in an engaging condition, which holds the position of the actuator 22. Accordingly, the oscillation of the actuator 22 by the slight rotational shock to be moved to the surface of the disk 1 can be avoided.

With respect to the linear acceleration, the line connecting the center of rotation and the mass center of gravity Ga of the actuator 22 makes an acute angle a with the line connecting the center of rotation and the mass center of gravity G1 of the inertial arm 7, which can substantially equalize the direction of the moment of rotation by the linear acceleration applied on each of the actuator and inertial arm. Accordingly, not only a rotational shock but also the operation of the actuator relative to the linear acceleration applied on the mass center of gravity can be restrained, and the oscillation of the actuator to the data area can be avoided.

As described above, according to the present invention, there is provided the second holding means for holding the actuator or inertial arm, and in the parking position, the line connecting the center of rotation and the mass center of gravity of the actuator makes the acute angle with the line connecting the center of rotation and the mass center of gravity of the inertial arm, and the oscillation of the actuator to the data area can be thereby avoided with respect to both of the slight rotational shock against which the inertial arm does not operate and the linear shock.

In the above description, the engaging part of the actuator and inertial arm are shaped in involute, however the present invention is not limited to this, and engagement with shafts may be applied as long as the relationship of the inertia and the distances from the engaging part is maintained.

As described above, according to the first invention of the present embodiment, there is provided the inertial arm rotatably supported, engaging the actuator when the head arm is in or near the parking position and releasing the engagement with the actuator when the head arm is in or near the position close to the disk recording medium and energizing means for holding a position of the inertial arm in a position where the engagement with the actuator is released. According to this, even if the rotational shock is externally applied when the actuator remains in the parking position, the moment of rotation is applied on each of the actuator and inertial arm in the same direction and the actuator and inertial arm mutually restrain their operations at the engaging part. Accordingly, the oscillation of the actuator to the data area can be avoided. Further, when loading, the position of the inertial arm is held by the energizing means in the position where the engagement with the actuator is released so that the release of the engagement and the mode of operation of the engagement between the actuator and inertial arm when loading/unloading can be surely achieved.

According to the second invention of the present embodiment, there is provided the inertial arm rotatably supported, engaging the actuator when the head arm is in or near the parking position, releasing the engagement with the actuator when the head arm is in or near the position close to the disk recording medium and having the wind receiver for receiving the force of air flow produced by rotation of the disk recording medium. According to this, even if the rotational shock is externally applied when the actuator remains in the parking position, the moment of rotation is applied on both of the actuator and inertial arm in the same direction and the actuator and inertial arm mutually restrain their operations at the engaging part. Accordingly, the oscillation of the actuator to the data area can be avoided. Further, when loading, the wind receiver receives the force of air flow produced by the rotation of the disk recording medium so that the force is always applied on the inertial arm in a direction of releasing the engagement with the actuator. Therefore, the position of the inertia arm is held without the energizing means according to the first invention, and the release of the engagement and the mode of operation of the engagement between the actuator and inertial arm when loading/unloading can be surely achieved.

As described above, according to the third invention of the present embodiment, providing the second holding means for holding the actuator or inertial arm permits always holding the position of the actuator against the slight shock which occurs in the parking position. Namely, the oscillation of the actuator to the data area can be avoided even when the slight shock is applied against which the inertial arm does not operate.

As described above, according to the fourth invention of the present invention, in the parking position, the line connecting the center of rotation and the mass center of gravity of the actuator makes the acute angle with the line connecting the center of rotation and the mass center of gravity of the inertial arm, which can substantially equalize the direction of the moment of rotation by the linear acceleration applied on each of the actuator and inertial arm. Accordingly, not only a rotational shock but also the operation of the actuator relative to the linear acceleration applied on the mass center of gravity can be restrained, and the oscillation of the actuator to the data area can be avoided.

As described above, according to the fifth invention of the present invention, there is provided the second holding means for holding the actuator or inertial arm, and in the parking position, the line connecting the center of rotation and the mass center of gravity of the actuator makes the acute angle with the line connecting the center of rotation and the mass center of gravity of the inertial arm, and the oscillation of the actuator to the data area can be thereby avoided with respect to both of the slight rotational shock against which the inertial arm does not operate and the linear shock.

What is claimed is:

1. A disk drive system comprising:

an actuator having a head arm mounted with a slider having a head element for recording data in a disk recording medium and reading the recorded data, unloading said head arm to a parking position and loading said head arm from said parking position to a position where said slider is close to a surface of said disk recording medium;

one and only one inertial arm rotatably supported for preventing rotational shock irrespective of direction, engaging said actuator when said head arm is in or near said parking position, maintaining said engagement during said parking position and until said head arm is in or near a position close to said disk recording medium, and releasing the engagement with said actuator when said head arm is in or near a position close to said disk recording medium; and energizing means for holding a position of said inertial arm in a location where the engagement with said actuator is released.

2. A disk drive system comprising:

an actuator having a head arm mounted with a slider having a head element for recording data in a disk recording medium and reading the recorded data, unloading said head arm to a parking position and loading said head arm from said parking position to a position where said slider is close to a surface of said disk recording medium;

one and only one inertial arm rotatably supported for preventing rotational shock irrespective of direction, engaging said actuator when said head arm is in or near said parking position, maintaining said engagement during said parking position and until said head arm is in or near a position close to said disk recording medium, and releasing engagement with said actuator when said head arm is in or near a position close to said disk recording medium;

first holding means for holding a position of said inertial arm in a location where engagement with said actuator is released; and second holding means for holding said actuator or said inertial arm in said parking position.

* * * * *